United States Patent
Onuki et al.

(10) Patent No.: US 8,047,918 B2
(45) Date of Patent: Nov. 1, 2011

(54) NETWORK GAME SYSTEM, GAME MACHINE, GAME MACHINE CONTROL METHOD, AND INFORMATION STORAGE MEDIUM

(75) Inventors: Katsunori Onuki, Minato-ku (JP); Ken Goto, Minato-ku (JP); Shin Tsuchiya, Minato-ku (JP); Toshikazu Munemasa, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 792 days.

(21) Appl. No.: 12/091,903

(22) PCT Filed: Sep. 13, 2006

(86) PCT No.: PCT/JP2006/318176
§ 371 (c)(1),
(2), (4) Date: Apr. 28, 2008

(87) PCT Pub. No.: WO2007/049408
PCT Pub. Date: May 3, 2007

(65) Prior Publication Data
US 2009/0118021 A1    May 7, 2009

(30) Foreign Application Priority Data

Oct. 27, 2005 (JP) ................. 2005-312500

(51) Int. Cl.
*A63F 9/24* (2006.01)
(52) U.S. Cl. .......... 463/42; 463/40; 463/43; 463/25
(58) Field of Classification Search .......... 463/25, 463/40, 42, 43
See application file for complete search history.

(56) References Cited

U.S. PATENT DOCUMENTS
2002/0035604 A1    3/2002  Cohen et al.
(Continued)

FOREIGN PATENT DOCUMENTS

| JP | 2000-279644 A | 10/2000 |
| JP | 2001-149658 A | 6/2001 |
| JP | 2003-117248 A | 4/2003 |
| JP | 2003-225469 A | 8/2003 |

(Continued)

OTHER PUBLICATIONS

Supplementary European Search Report dated Oct. 24, 2008.

Primary Examiner — Dmitry Suhol
Assistant Examiner — Brandon Gray
(74) Attorney, Agent, or Firm — Sughrue Mion, PLLC (57) ABSTRACT

To provide a network game system capable of switching a server-client machine, while avoiding deterioration in the excitement of a game. A network game system (10) causes each of a plurality of game machines (12) to operate as a client and at least one of the plurality of game machines (12) to operate as a server. In the where a switching determination time arrives, a switching determination unit (52) determines whether or not to switch the game machine (12) operating as a server from the game machine (12) currently operating as the server to another game machine (12) of the plurality of game machines (12), based on the play evaluation value corresponding to each of at least one of the game machines (12). In the case where it is determined not to switch the game machine (12) operating as the server from the game machine (12) currently operating as the server to another game machine, a switching determination inhibiting unit (56) inhibits a switching determination unit (52) from making a decision during a period before a given switching inhibited period elapses.

9 Claims, 8 Drawing Sheets

U.S. PATENT DOCUMENTS

| | | | |
|---|---|---|---|
| 2002/0147047 A1* | 10/2002 | Letovsky et al. | 463/42 |
| 2002/0161821 A1 | 10/2002 | Narayan et al. | |
| 2002/0165630 A1* | 11/2002 | Arthur et al. | 700/91 |
| 2004/0063479 A1* | 4/2004 | Kimura | 463/4 |
| 2004/0166914 A1 | 8/2004 | Ishihata et al. | |
| 2005/0181872 A1* | 8/2005 | Acharya et al. | 463/35 |
| 2006/0079329 A1 | 4/2006 | Yamada et al. | |
| 2006/0199644 A1 | 9/2006 | Hirota | |
| 2008/0300046 A1* | 12/2008 | Gagner et al. | 463/25 |

FOREIGN PATENT DOCUMENTS

| | | |
|---|---|---|
| JP | 2003-265861 A | 9/2003 |
| JP | 2004-174091 A | 6/2004 |
| JP | 2004-344353 A | 12/2004 |
| JP | 2004-350910 A | 12/2004 |
| JP | 2005-204948 A | 8/2005 |
| JP | 2005-318934 A | 11/2005 |
| TW | 222379 B | 10/2004 |
| WO | 02/47780 A1 | 6/2002 |

* cited by examiner

| PLAYER ID | GEME MACHINE ID | PLAY EVALUATION VALUE |
|---|---|---|
| P 1 | D 1 | 3 0 |
| P 2 | D 2 | 2 2 |

FIG.6

| PLAY TYPE | EVALUATION VALUE |
|---|---|
| DRIBBLE | 1 |
| PASS | 2 |
| SHOOT | 5 |
| FOUL | − 2 |

NETWORK GAME SYSTEM, GAME MACHINE, GAME MACHINE CONTROL METHOD, AND INFORMATION STORAGE MEDIUM

CROSS REFERENCE TO RELATED APPLICATIONS

This application is a National Stage of International Application No. PCT/JP2006/318176 filed on Sep. 13, 2006, claiming priority based on Japanese Patent Application No. 2005-312500, filed Oct. 27, 2005, the contents of all of which are incorporated herein by reference in their entirety.

TECHNICAL FIELD

The present invention relates to a network game system, a game machine, a game machine control method, and an information storage medium.

BACKGROUND ART

A network game system which comprises a plurality of game machines each having a server function and a client function, in which the respective game machines operate as clients and at least one game machine also operates as a server, thereby providing a game to be played by the players of a plurality of game machines, is available (for example, in paragraph 0154 of Patent Document 1). For example, in a known network game system, a soccer game is played by the players of two game machines, in which one of the two game machines operating as a client also operates as a server, or a server-client machine, and the other operates solely as a client, or a client-dedicated machine.

Patent Document 1: Japanese Patent Laid-open Publication No. 2003-225469

In this network game system, the client-dedicated machine executes the game while exchanging data with the server-client machine via a communication network, which makes the client-dedicated machine inferior in terms of ability to respond to game operations, compared to the server-client machine. Consequently, the player of the client-dedicated machine is forced to play the game in a disadvantageous situation compared to the player of the server-client machine. The network game system providing the soccer game as described above addresses this problem by assigning the role of a server to a different game machine between the first and second halves of the game.

DISCLOSURE OF THE INVENTION

Problems to be Solved by the Invention

However, a network game system providing a soccer game as described above, for example, in which the server-client machine is switched regardless of the content of the match, may lower the excitement of the game.

The present invention has been conceived in view of the above, and aims to provide a network game system, a game machine, a game machine control method, and an information storage medium for switching the server-client machine from the game machine currently operating as a server-client machine to another game machine while avoiding lowering of the excitement of a game.

Means for Solving the Problem

In order to address the above-described problem, according to one aspect of the present invention, there is provided a network game system including a plurality of game machines each having a server function and a client function, in which each of the plurality of game machines operates as a client and at least one of the plurality of game machines also operates as a server, thereby providing a game to be played by players of the plurality of game machines, comprising play evaluation value calculating means for calculating a play evaluation value corresponding to each of at least one of the plurality of game machines during the game; switching determination time monitoring means for monitoring to see whether or not a predetermined switching determination time, which repetitively arrives during the game, arrives; switching determination means for making a determination as to, in the case where the switching determination time arrives, whether or not to switch the game machine operating as a server from a game machine currently operating as the server to another game machine of the plurality of game machines, based on the play evaluation value calculated by the play evaluation value calculating means; and switching determination inhibiting means for inhibiting the switch determination means from making the determination during a period before a given switching inhibited period elapses, in the case where it is determined not to switch the game machine operating as the server from the game machine currently operating as the server to another game machine of the plurality of game machines.

According to another aspect of the present invention, there is provided a game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising play evaluation value calculating means for calculating a play evaluation value corresponding to each of at least one of the plurality of game machines during the game; switching determination time monitoring means for monitoring to see whether or not a predetermined switching determination time, which repetitively arrives during the game, arrives; switching determination means for making a determination as to, in the event that the switching determination time arrives, whether or not to switch the game machine operating as a server from a game machine currently operating as the server to another game machine of the plurality of game machines, based on the play evaluation value calculated by the play evaluation value calculating means; and switching determination inhibiting means for inhibiting the switch determination means from making the determination during a period before a given switching inhibited period elapses, in the case where it is determined not to switch the game machine operating as the server from the game machine currently operating as the server to another game machine of the plurality of game machines.

According to still another aspect of the present invention, there is provided a game machine control method for controlling a game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising a play evaluation value calculating step of calculating a play evaluation value corresponding to each of at least one of the plurality of game machines during the game; a switching determination time monitoring step of monitoring to see whether or not a predetermined switching determination time, which repetitively arrives during the game, arrives; a switching determination step of determining, in the event that the switching determination time arrives, whether or not to switch the game machine operating as a server from a game machine currently operating as the server to another game machine of the plurality of game machines, based on the play evaluation value calculated at the play evaluation value calculating step; and a switching determination inhibiting step of inhibiting determination from being made at the switch determination step before a given switching inhibited period elapses, in the case where it is determined not to switch the game machine operating as a server from the game machine currently operating as the server to another game machine of the plurality of game machines.

According to yet another aspect of the present invention, there is provided a program for causing a computer, including, for example a personal computer, a home-use game machine, a portable game machine, a commercial game machine, a portable telephone, a personal digital assistant (PDA), and so forth, to function as a game machine included in a network game system including a plurality of game machines each having a server function and a client function, in which each of the plurality of game machines operates as a client and at least one of the plurality of game machines also operates as a server, thereby providing a game to be played by players of the plurality of game machines, the computer functioning as play evaluation value calculating means for calculating a play evaluation value corresponding to each of at least one of the plurality of game machines during the game; switching determination time monitoring means for monitoring to see whether or not a predetermined switching determination time, which repetitively arrives during the game, arrives; switching determination means for, in the event that the switching determination time arrives, making a determination as to whether or not to switch the game machine operating as a server from a game machine currently operating as the server to another game machine of the plurality of game machines, based on the play evaluation value calculated by the play evaluation value calculating means; and switching determination inhibiting means for inhibiting the switch determination means from making the determination during a period before a given switching inhibited period elapses, in the case where it is determined not to switch the game machine operating as the server from the game machine currently operating as the server to another game machine of the plurality of game machines.

The information storage medium according to the present invention may be a computer readable information storage medium storing the above-described program. The program distribution device according to the present invention may comprise an information storage medium storing the above-described program, and means for reading the above-described program from the information storage medium, and distributing the program. The program distribution method according to the present invention is a method, while using an information storage medium recording the above-described program, for reading the above-described program from the information storage medium and distributing the program.

The present invention relates to a network game system including a plurality of game machines each having a server function and a client function, in which each of the plurality of game machines operates as a client and at least one of the plurality of game also machines operates as a server, thereby providing a game to be played by players of the plurality of game machines. According to the present invention, a play evaluation value corresponding to each of at least one of the plurality of game machines during the game is calculated. Whether or not a predetermined switching determination time, which repetitively arrives during the game, arrives is monitored. In the case where the switching determination time arrives, whether or not to switch the game machine operating as a server from the game machine currently operating as the server to another game machine of the plurality of game machines is determined based on the calculated play evaluation value. In the case where it is determined not to switch the game machine operating as the server from the game machine currently operating as the server to another game machine of the plurality of game machines, the determination as to whether or not to switch the game machine operating as the server from the game machine currently operating as the server to another game machine of the plurality of game machines is not made during a period before a given switching inhibited period elapses. According to the present invention, the server-client machine is switched based on a play evaluation value of each game machine, which is calculated during the game. This makes it possible to switch the server-client machine while considering the game situation, and consequently while avoiding reduction in the excitement of a game.

In one embodiment of the present invention, the play evaluation value calculating means may calculate at least a play evaluation value corresponding to the game machine operating as the server, and the switching determination means may include means for determining whether or not the play evaluation value corresponding to the game machine currently operating as the server satisfies a given switch inhibiting condition, and may determine not to switch the game machine operating as the server from the game machine currently operating as the server to another game machine of the plurality of game machines in the event that the play evaluation value corresponding to the game machine currently operating as the server satisfies the switch inhibiting condition.

In one embodiment of the present invention, the switching determination means may include means for determining to switch the game machine operating as the server from the game machine currently operating as the server to another game machine of the plurality of game machines, in the case where the switching determination time arrives after a given switch delay period elapses without switching the game machine operating as the server from the game machine currently operating as the server to another game machine of the plurality of game machines.

In one embodiment of the present invention, the switching determination means may include means for switching the game machine operating as the server from the game machine currently operating as the server to another game machine of the plurality of game machines in the case where the switching determination time arrives after a predetermined number of successive determinations made not to switch the game machine operating as the server from the game machine currently operating as the server to another game machine of the plurality of game machines.

BEST MODE FOR CARRYING OUT THE INVENTION

In the following, one example of an embodiment of the present invention will be described in detail with reference to the accompanying drawings.

Figure 1:
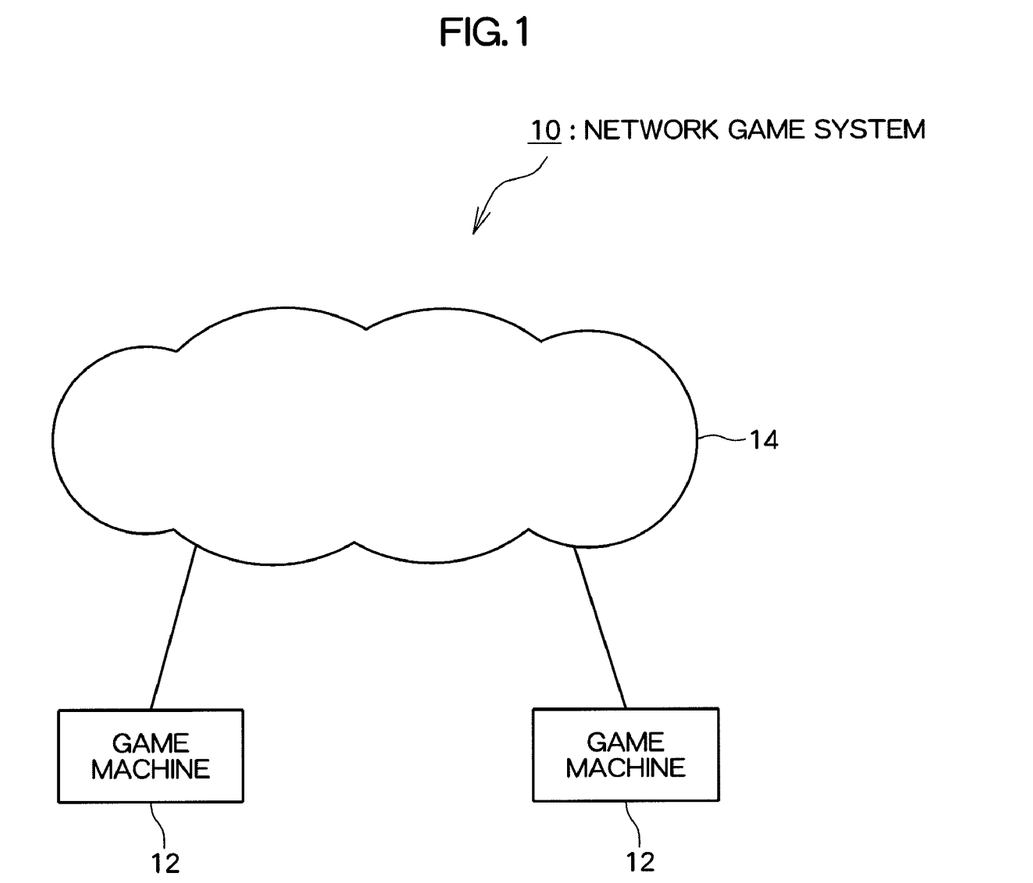
FIG. 1 is a diagram showing an overall structure of a network game system according to this embodiment.

FIG. 1 is a diagram showing an overall structure of a network game system according to an embodiment of the present invention. As shown, the network game system 10 comprises a plurality of game machines 12, each connected to a communication network 14, such as the Internet or the like, and capable of exchanging data among one another.

The game machine 12 is a computer system comprising, for example, a microprocessor, a main memory, a hard disk device, a disk reading device, a communication interface, an operating unit, an image processing unit, a monitor, and so forth. The operating unit is a game controller, a mouse, or the like, for example. The disk reading device is a device for reading content stored in an optical disc (information storage medium), such as a DVD-ROM, or the like, for example. The communication interface is an interface for connection between the game machine 12 and the communication network 14. The image processing unit includes a VRAM and renders a game screen image in the VRAM based on the image data sent from the microprocessor. The image processing unit converts the content of the VRAM into a video signal, and outputs at a predetermined timing to the monitor. The game machine 12 is formed using a publicly known conventional home-use game machine, portable game machine, personal digital assistant, portable phone, personal computer, or the like, for example.

In the thus structured network game system 10, each game machine 12 stores information about a common game situation (game situation information) in the main memory thereof, and the common game situation is updated according to an operation carried out in each game machine 12. Further, a game screen showing a common game situation is displayed on the monitor of each game machine 12. As described above, the network game system 10 realizes a network game participated in by a plurality of players via the communication network 14.

In the network game system 10, each game machine 12 has a server function and a client function. The server function refers to a function for sharing game situation information held in each game machine 12 among respective game machines 12, and includes, for example, (a) a function for managing game situation information to be used as a reference (original game situation information), (b) a function for updating original game situation information based on the content of an operation carried out in each game machine 12, and (c) a function for reflecting the updated content in game situation information held by another game machine 12 (subgame situation information). The client function includes, for example, (a) a function for supplying the content of an operation carried out by a player to a server function and (b) a function for updating the game screen image based on the game situation information updated by the server function.

In the network game system 10, the respective game machines 12 operate as clients, and at least one game machine 12 also operates as a server. In other words, in the network game system 10, various information (for example, operation information, game situation update information, and so forth) is exchanged between the server function of at least one game machine 12 and the client functions of the respective game machines 12 thus realizing the above-described network game.

It should be noted that, in the following, a situation in which a game machine 12 operates as a client and also a server is referred to as a server-client state and a game machine 12 in a server-client state is referred to as a server-client machine. A state in which a game machine 12 operates as a client but not as a server is referred to as a client-dedicated state, and a game machine 12 in a client-dedicated state is referred to as a client-dedicated machine.

In the following, the network game system 10 provides a soccer game match to be played by the players of two game machines 12. In the main memory of each game machine 12, a common game space in which players belonging to the respective teams, a ball, and so forth are placed, is created. A game screen image showing the situation held in the common game space is shown on the monitors of the respective game machines 12.

In the network game system 10, a server-client machine is switched from one game machine 12 to another game machine 12 during a game. In the following, a technique for achieving the switching of the server-client machine while avoiding deterioration in the excitement of the game will be described.

Figure 2:
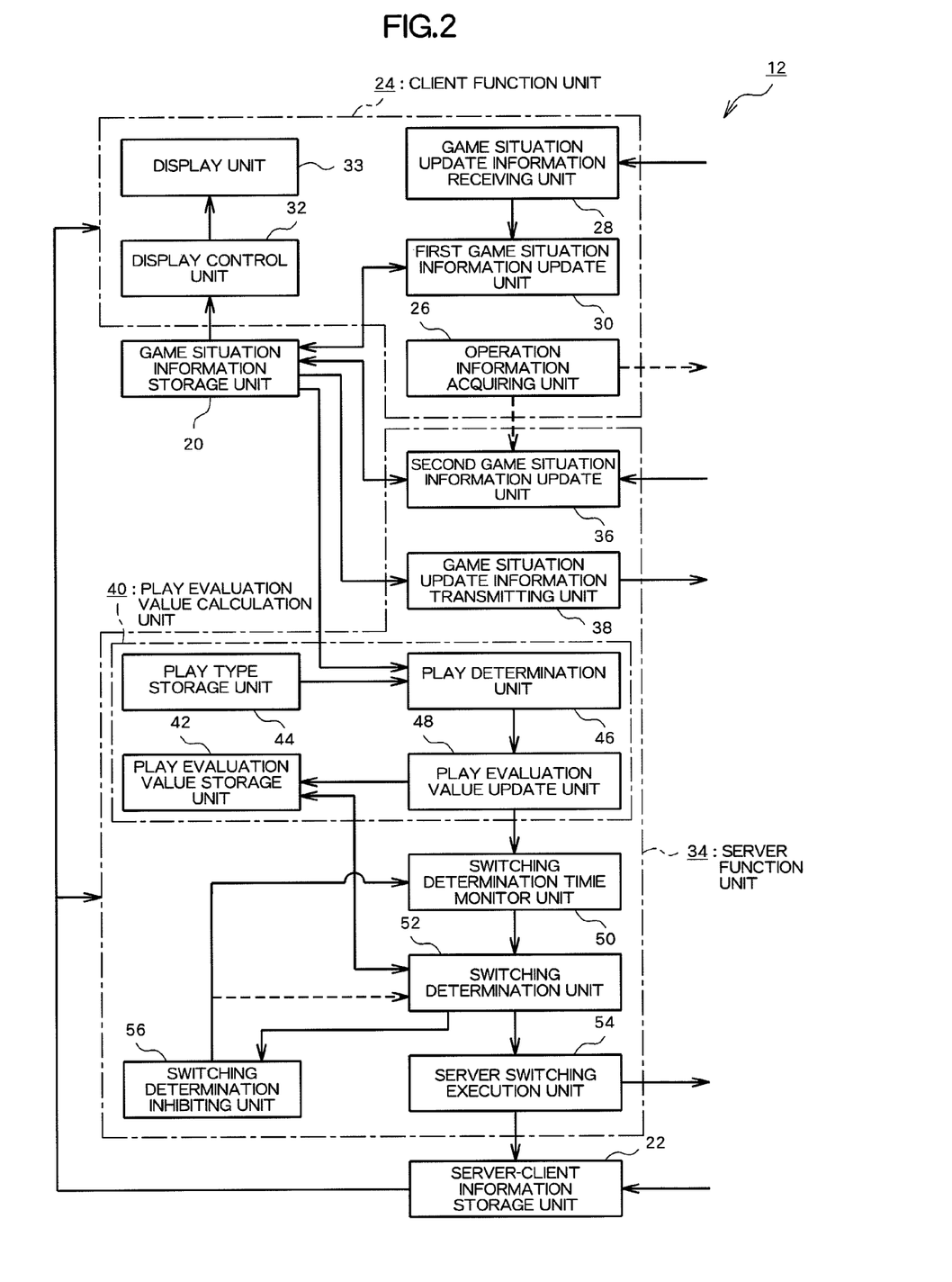
FIG. 2 is a functional block diagram of a game machine included in the network game system according to this embodiment.

FIG. 2 is a functional block diagram showing functions according to the present invention among those realized in each game machine 12. As shown, each game machine 12 comprises a game situation information storage unit 20, a server-client information storage unit 22, a client function unit 24, and a server function unit 34. These functions are realized in each game machine 12 by carrying out a game program provided being stored in an information storage medium, such as a DVD-ROM or the like, or via the communication network 14, such as the Internet or the like.

Figure 3:
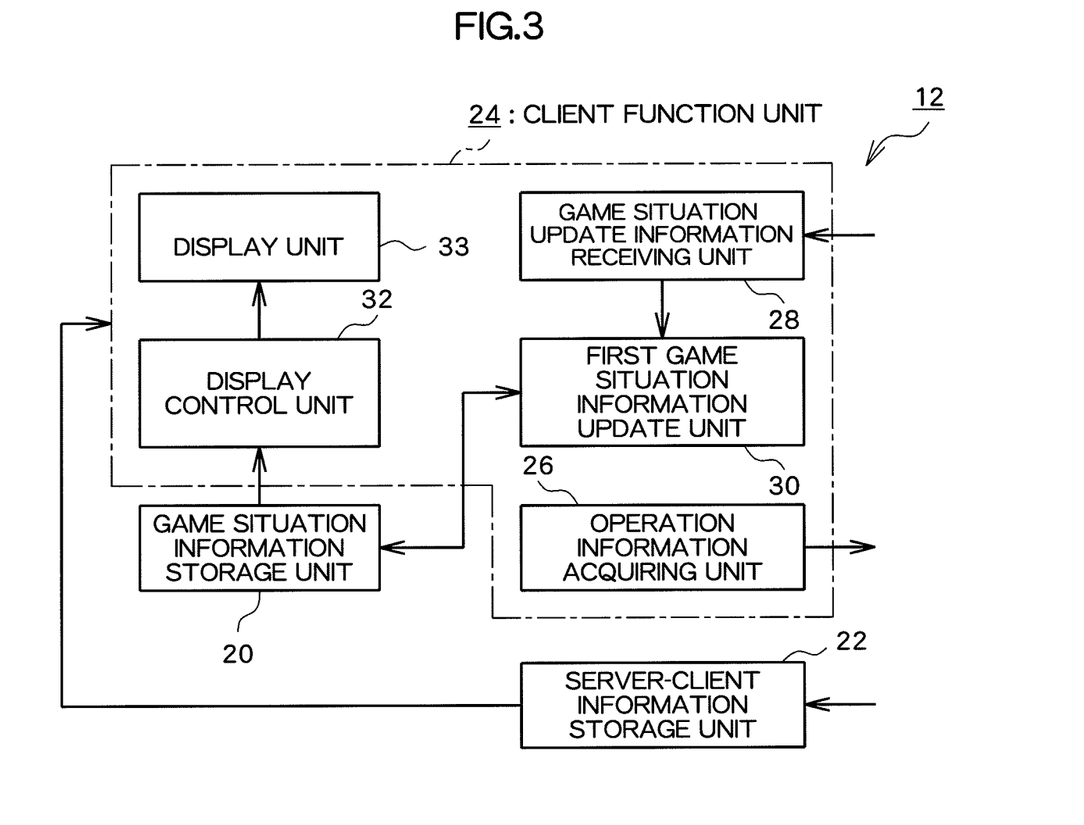
FIG. 3 is a functional block diagram of a client-dedicated machine.
Figure 4:
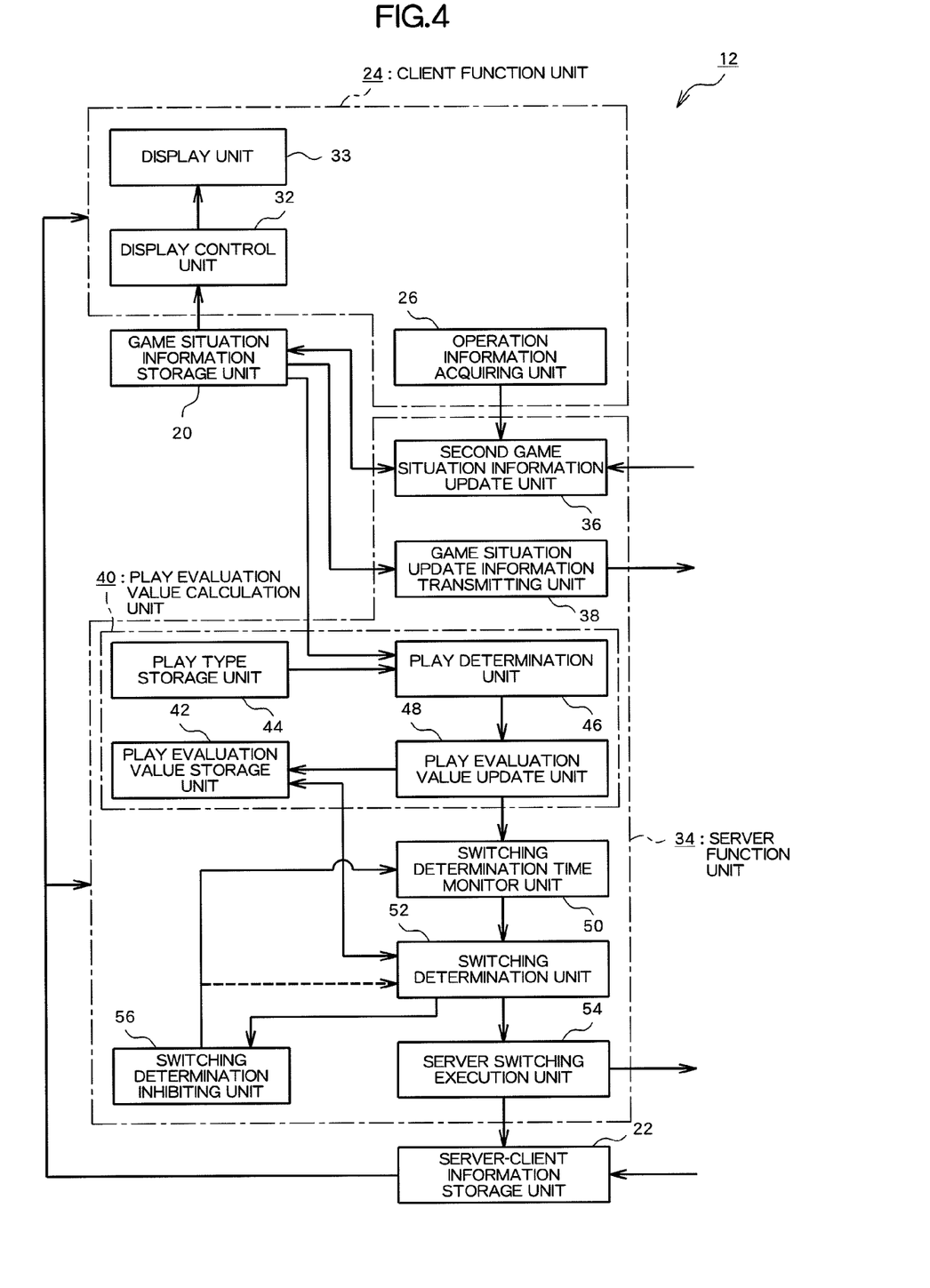
FIG. 4 is a functional block diagram of a server-client machine.

FIG. 3 shows a function realized by the game machine 12 in a client-dedicated state among those shown in FIG. 2. That is, FIG. 3 is a functional block diagram of a client-dedicated machine. FIG. 4 shows a function realized by the game machine 12 in a server-client state among those shown in FIG. 2. That is, FIG. 4 is a functional block diagram of a server-client machine.

[Game Situation Information Storage Unit]

The game situation information storage unit 20 is realized using the main memory of the game machine 12 as a main component. The game situation information storage unit 20 stores game situation information about a game situation. In this embodiment, the game situation information describes, for example, the state (such as position, posture, moving direction, moving speed, movement type, such as dribble, pass, shoot, and so forth) of each player character placed in the game space, and the state (position, moving direction, moving speed, and so forth) of the ball. The game situation information may also describe a game situation, such as scores of the respective teams, a period of time elapsed, and so forth.

[Server-Client Information Storage Unit]

The server-client information storage unit 22 is realized using the main memory of the game machine 12 as a main component. In this embodiment, the server-client information storage unit 22 stores a server-client state flag which indicates whether or not the game machine 12 concerned is in a server-client state. The server-client state flag is numeric information taking the value 0 or 1. The server-client state flag takes the value 0 for the game machine 12 not in a server-client state (that is, in a client-dedicated state), and takes the value 1 for the game machine 12 in the server-client state. It should be noted that the server-client information storage unit 22 may store information specifying a server-client machine at that time. For example, identification information (game machine ID) of the game machine 12 which operates as a server-client machine at that time may be stored.

[Client Function Unit]

The client function unit 24 realizes the client function of the game machine 12. The client function unit 24 comprises an operation information acquiring unit 26, a game situation update information receiving unit 28, a first game situation information update unit 30, a display control unit 32, and a display unit 33.

[Operation Information Acquiring Unit]

The operation information acquiring unit 26 comprises an operating unit of the game machine 12. The operation information acquiring unit 26 acquires operation information corresponding to the content of an operation carried out by the player, based on an operation signal input from the operating unit.

The operation information may be information describing, for example, the content of an operation carried out by the player, which is determined based on an operation signal input from the operating unit, or information indicative of an operation signal itself input from the operation unit. Alternatively, the operation information may be information describing the content of a movement instruction directed to the player character to be controlled. The content of a movement instruction may be, for example, dribble, pass, shoot, and so forth, and determined based on an operation signal input from the operating unit. To be described later, the operation information is used as a basis in updating the game situation information stored in the game situation information storage unit 20.

The operation information acquiring unit 26 supplies the acquired operation information to the second game situation information update unit 36 of the server-client machine. That is, in the game machine 12 in the server-client state, the operation information acquiring unit 26 supplies the operation information to the second game situation information update unit 36 in its own game machine 12 (see FIG. 4), and in the game machine 12 in the client-dedicated state, the operation information acquiring unit 26 supplies the operation information to the second game situation information update unit 36 of the server-client machine via the communication network 14 (see FIG. 3).

[Game Situation Update Information Receiving Unit]

The game situation update information receiving unit 28 is realized using the microprocessor and communication interface of the game machine 12 as main components. The game situation update information receiving unit 28 is realized only when the game machine 12 is in a client-dedicated state (see FIGS. 3 and 4). The game situation update information receiving unit 28 holds the game situation update information received from the game situation update information transmitting unit 38 of the server-client machine. The game situation update information received by the game situation update information receiving unit 28 is supplied to the first game situation information update unit 30. Details of the game situation update information will be described later.

[First Game Situation Information Update Unit]

The first game situation information update unit 30 is realized using the microprocessor of the game machine 12 as a main component. The first game situation information update unit 30 is also realized only when the game machine 12 is in a client-dedicated state (see FIGS. 3 and 4), similar to the game situation update information receiving unit 28. The first game situation information update unit 30 updates the game situation information stored in the game situation information storage unit 20, based on the game situation update information received by the game situation update information receiving unit 28.

[Display Control Unit and Display Unit]

The display control unit 32 is realized using the image processing unit of the game machine 12 as a main component. The display unit 33 is realized using the monitor of the game machine 12 as a main component. The display control unit 32 produces a game screen image based on the game situation information stored in the game situation information storage unit 20, and controls the display unit 33 so as to display the game screen image.

[Server Function Unit]

The server function unit 34 realizes the server function of the game machine 12. The server function unit 34 is realized only when the game machine 12 is in a server-client (see FIGS. 3 and 4). The server function unit 34 comprises a second game situation information update unit 36, a game situation update information transmitting unit 38, a play evaluation value calculation unit 40, a switching determination time monitor unit 50, a switching determination unit 52, a server switching execution unit 54, and a switching determination inhibiting unit 56.

[Second Game Situation Information Update Unit]

The second game situation information update unit 36 is realized using the microprocessor of the game machine 12 as a main component. The second game situation information update unit 36 updates the game situation information stored in the game situation information storage unit 20, based on the operation information supplied from the operation information acquiring unit 26 of each game machine 12.

[Game Situation Update Information Transmitting Unit]

The game situation update information transmitting unit 38 is realized using the microprocessor and communication interface of the game machine 12 as main components. The game situation update information transmitting unit 38 sends, in the case where the game situation information stored in the game situation information storage unit 20 is updated by the second game situation information update unit 36, the updated content of the game situation information storage unit 20 so that the updated content is reflected in the game situation information stored in the game situation information storage unit 20 of the other game machine 12.

For example, the game situation update information transmitting unit 38 sends all or some of the game situation information stored in the game situation information storage unit 20, as game situation update information. Also, for example, the game situation update information transmitting unit 38 may send, as game situation update information, information describing the content updated by the second game situation information update unit 36.

[Play Evaluation Value Calculation Unit]

The play evaluation value calculation unit 40 calculates a play evaluation value corresponding to each of at least one of the plurality of game machines 12 during the game. In this embodiment, the play evaluation value calculation unit 40 calculates a play evaluation value corresponding to each of the plurality of game machines 12. The play evaluation value calculation unit 40 comprises a play evaluation value storage unit 42, a play type storage unit 44, a play determination unit 46, and a play evaluation value update unit 48.

[Play Evaluation Value Storage Unit]

Figure 5:
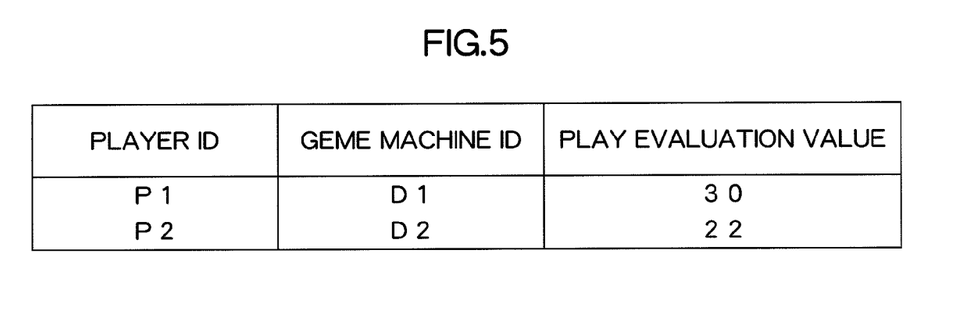
FIG. 5 is a diagram showing one example of a play evaluation value table.

The play evaluation value storage unit 42 is realized using the main memory of the game machine 12 as a main component. The game play evaluation value storage unit 42 stores a play evaluation value corresponding to each game machine 12, specifically, a play evaluation value table, such as is shown in FIG. 5, in this embodiment. As shown, the play evaluation value table includes a "player ID" field, a "game machine ID" field, and a "play evaluation value" field. In the "player ID" field, a player ID (identification information uniquely identifying each player) is stored. In the "game machine ID" field, the game machine ID (identification information uniquely identifying the game machine 12) of the game machine of the player is stored. In the "play evaluation value" field, the game evaluation values acquired by the player are accumulatively stored. It should be noted that in the case where one player corresponds to one game machine or the like, either the "player ID" field or the "game machine ID" field may be omitted.

[Play Type Storage Unit]

Figure 6:
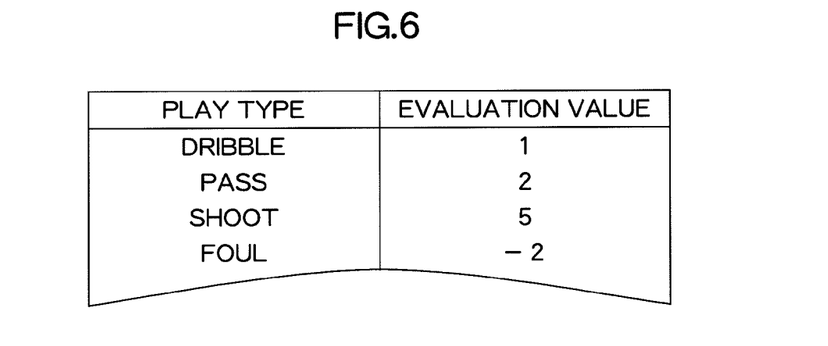
FIG. 6 is a diagram showing one example of a play type table.

The play type storage unit 44 is realized using the main memory of the game machine 12 as a main component. The play type storage unit 44 stores an evaluation value in association with a play type. The play type storage unit 44 stores a play type table such as is shown in FIG. 6, for example. As shown, the play type table includes a "play type" field and an "evaluation value" field. In the "play type" field, information identifying a play type is stored. In this embodiment, a play type corresponding to the kind of a movement (dribble, shoot, pass, and so forth, for example) carried out by a player character or a play type corresponding to a game event (for example, a foul event, a score event, a yellow card, a red card, and so forth) occurring in response to the movement of a player character is defined. In the "evaluation value" field, an evaluation value to be imparted to a player who carries out a game play belonging to the defined play type, is stored.

[Play Determination Unit]

The play determination unit 46 is realized using the microprocessor of the game machine 12 as a main component. The play determination unit 46 determines whether or not a game play belonging to any play type stored in the play type storage unit 44 is carried out by the player of each game machine 12. This determination is made based on the game situation information stored in the game situation information storage unit 20 and/or the operation information acquired by the operation information acquiring unit 26 of each game machine 12.

In this embodiment, the play determination unit 46 acquires the kind of movement made by the character to be controlled by each player, based on the game situation information stored in the game situation information storage unit 20 (or operation information acquired by the operation information acquiring unit 26 of each game machine 12). Then, the play determination unit 46 determines whether or not the kind of movement made by the character to be controlled by each player is the kind of movement corresponding to any play type stored in the play type storage unit 44. In the case where it is determined that the kind of movement made by the character to be controlled is the same as the kind of movement corresponding to any play type, the play determination unit 46 determines that a game play corresponding to the play type is carried out by the player.

Also, in this embodiment, the play determination unit 46 determines whether or not a game event corresponding to any play type stored in the play type storage unit 44 occurs due to the movement of the character to be controlled by each player. This determination is also made based on the game situation information stored in the game situation information storage unit 20 (or operation information acquired by the operation information acquiring unit 26 of each game machine 12). In the case where the game event which occurs due to the movement of the character to be controlled is a game event corresponding to any play type, the play determination unit 46 determines that a game play belonging to that play type is carried out by the player.

[Play Evaluation Value Update Unit]

The play evaluation value update unit 48 is realized using the microprocessor of the game machine 12 as a main component. The play evaluation value update unit 48 updates the content of the play evaluation value storage unit 42 based on the result of a determination made by the play determination unit 46. More specifically, in the case where it is determined that the game play carried out by the player belongs to any play type, the play evaluation value update unit 48 updates the play evaluation value stored so as to correspond to the player (the player's game machine 12), based on the evaluation value stored so as to correspond to that play type, with detail thereof to be described later (see S107 in FIG. 8).

[Switching Determination Time Monitor Unit]

The switching determination time monitor unit 50 is realized using the microprocessor and time measurement unit of the game machine 12 as main components. During a game, the switching determination time monitor unit 50 monitors whether or not a predetermined switching determination time arrives. A switching determination time repetitively arrives during a game. In this embodiment, a switching determination time is a time based on shift from an in-play state to an out-of-play state. It should be noted that an "out-of-play" state refers to a state in which the ball is present beyond the goal or touch line or the judge suspends the game due to a foul, a person being injured, or the like. An "in-play" state refers to a state other than an out-of-play state, in which the ball is present within the playing area, rather than beyond the goal or touch line, with the game kept ongoing. Whether the game is in an in-play state or an out-of-play state is determined based on, for example, the game situation information (the position of a ball, or the like) stored in the game situation information storage unit 20.

[Switching Determination Unit]

The switching determination unit 52 is realized using the microprocessor of the game machine 12 as a main component. The switching determination unit 52 determines, in the case where a switching determination time has arrived, whether or not to switch the server-client machine from the game machine 12 currently operating as a server-client machine to another game machine 12, based on a play evaluation value calculated by the play evaluation value calculation unit 40.

For example, the switching determination unit 52 determines whether or not predetermined switch inhibiting condition is satisfied, based on the play evaluation value calculated by the play evaluation value calculation unit 40. Then, the switching determination unit 52 determines to switch the server-client machine from the game machine 12 currently operating as a server-client machine to another game machine 12 in the case where it is determined that the switch inhibiting condition is not satisfied, and not to switch the server-client machine from the game machine 12 currently operating as a server-client machine to another game machine 12 in the case where it is determined that the condition is satisfied.

The switch inhibiting condition concerns, for example, whether or not a play evaluation value corresponding to the game machine 12 operating as a server-client machine is equal to or larger than a given reference value. Here, a given reference value may be a predetermined value or a value based on a play evaluation value corresponding to the game machine 12 operating as a client-dedicated machine (for example, the play evaluation value itself). Also, one of the values, which is largest at each switching determination time, may be used as the above-described reference value.

In the case where a switching determination time arrives after a predetermined delay period (a given switch delay period) elapses after a given reference time without switching the server-client machine from the game machine 12 currently operating as a server-client machine to another game machine 12, the switching determination unit 52 determines to switch the server-client machine from the game machine 12 currently operating as a server-client machine to another game machine 12. It should be noted that the given reference time is a time here based on the time of previous switching of the server-client machine.

Alternatively, the switching determination unit 52 may determine to switch the server-client machine from the game machine 12 currently operating as a server-client machine to another game machine 12 in the case where a switching determination time arrives after a predetermined number of successive determinations made not to switch the server-client machine from the game machine 12 currently operating as a server-client machine to another game machine 12.

[Server Switching Execution Unit]

The server switching execution unit 54 is realized using the microprocessor of the game machine 12 as a main component. The server switching execution unit 54 switches the server-client machine from the game machine 12 currently operating as a server-client machine to another game machine 12 in the case where the switching determination unit 52 determines to switch the server-client machine from the game machine 12 currently operating as a server-client machine to another game machine 12.

The server switching execution unit 54 may select in any manner a game machine 12 to newly operate as a server-client machine. For example, the selection may be made at random or based on the play evaluation value calculated by the play evaluation value calculation unit 40.

In order to cause the selected game machine 12 to operate as a server-client machine, the server switching execution unit 54 updates the server-client information stored in the server-client information storage unit 22 of the respective game machines 12. In this embodiment, the server-client state flag stored in the server-client information storage unit 22 of the selected game machine 12 is set to 1, and those stored in the server-client information storage units 22 of other game machines 12 are set to 0.

[Switching Determination Inhibiting Unit]

The switching determination inhibiting unit 56 is realized using the microprocessor and time measurement unit of the game machine 12 as main components. In the event that the switching determination unit 52 determines not to switch the server-client machine from the game machine 12 currently operating as a server-client machine to another game machine 12, the switching determination inhibiting unit 56 inhibits the switching determination unit 52 from making a decision during a period before a given switching inhibited period elapses. As a result, during the period at least before the switching inhibited period elapses, the switching by the server switching execution unit 54 is prevented from being carried out.

In this embodiment, the switching determination inhibiting unit 56 inhibits the switching determination time monitor unit 50 from monitoring to thereby indirectly inhibit the switching determination unit 52 from making a decision. Alternatively, the switching determination inhibiting unit 56 may directly inhibit the switching determination unit 52 from making a decision.

Figure 7:
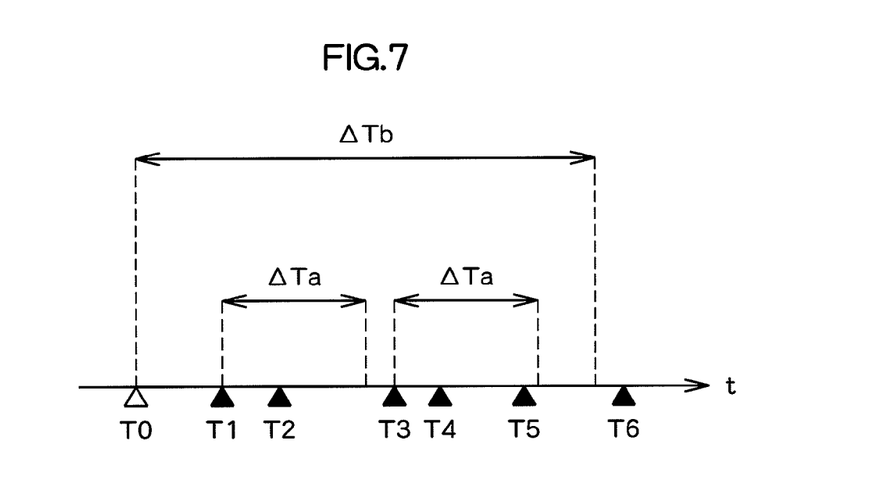
FIG. 7 is a diagram explaining switching of the server-client machine.

Here, operations of the switching determination time monitor unit 50, the switching determination unit 52, the server switching execution unit 54, and the switch limit unit 56 will be described in more detail. FIG. 7 is a diagram explaining operations concerning these function blocks. It should be noted that T0 to T6 in FIG. 7 represent respective times at which an out-of-play state is established (a switching determination time), and that the server-client machine is assumed to be switched at T0.

As described above, in the case where an out-of-play state is established (T1), the switching determination unit 52 determines whether or not to switch the server-client machine. In the case that it is determined to switch the server-client machine, the server switching execution unit 54 switches the server-client machine.

Meanwhile, In the case where it is determined not to switch the server-client machine, the switching determination time monitor unit 50 is refrained from monitoring during a period since then to elapse of a predetermined switching inhibited period of time ($\Delta Ta$), and whether or not to switch the server-client machine is not determined even though an out-of-play state is established during the period (T2).

In the event that the switching inhibited period of time has elapsed, the switching determination time monitor unit 50 resumes monitoring. Then, with the out-of-play state established (T3), the switching determination unit 52 makes a decision. Here again, in the case where it is determined not to switch the server-client machine, the switching determination time monitor unit 50 refrains from monitoring during the period since then to the lapse of a switching inhibited period of time ($\Delta Ta$). In this case also, whether or not to switch the server-client machine is not determined even though an out-of-play state is established during the period before the switching inhibited period of time elapses (T4, T5).

In the case where an out-of-play state is established (T6) after elapse of a predetermined switching delayed period of time ($\Delta Tb$) after the last switching of the server-client machine, the switching determination unit 52 determines to switch the server-client machine without relying on the play evaluation value calculated by the play evaluation value calculation unit 40.

It should be noted that in the case where an out-of-play state is established (T6) after a predetermined number (twice, for example) of successive determinations not to switch the server-client machine after the last switching of the server-client machine (T1, T3), the switching determination unit 52 may determine to switch the server-client machine without relying on the play evaluation value calculated by the play evaluation value calculation unit 40.

Figure 8:
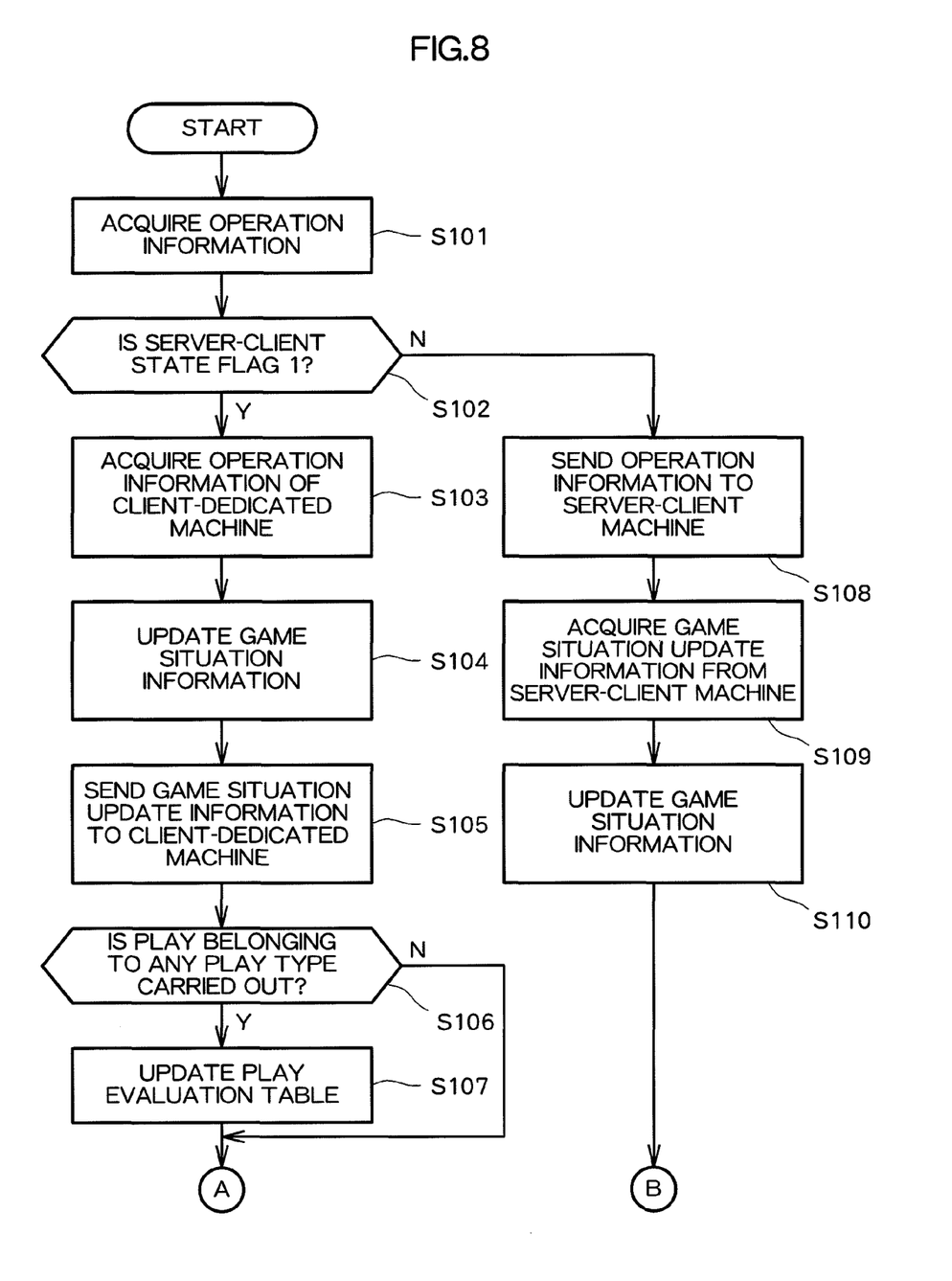
FIG. 8 is a flowchart of a process carried out in each game machine.
Figure 9:
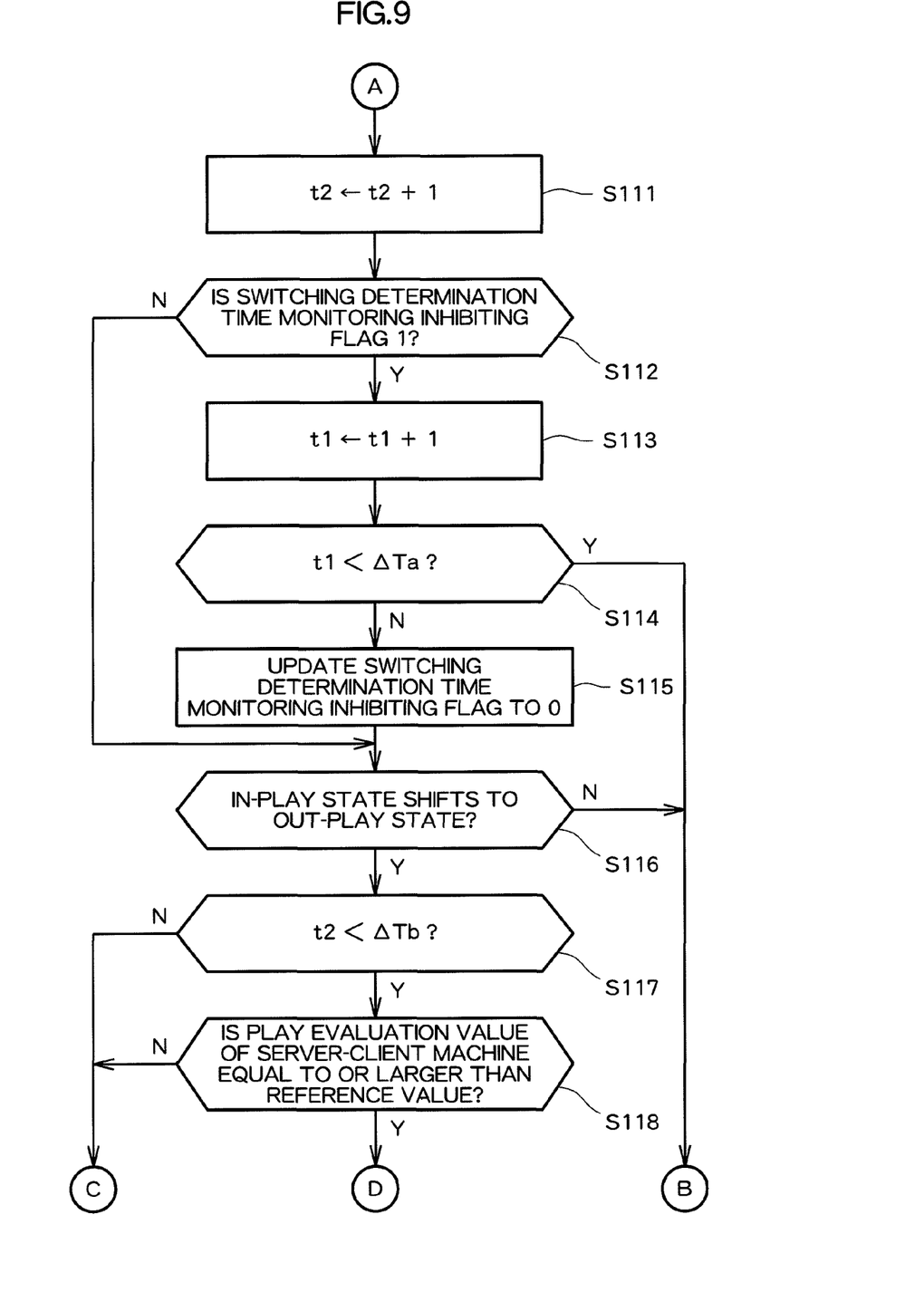
FIG. 9 is a flowchart of a process carried out in each game machine.
Figure 10:
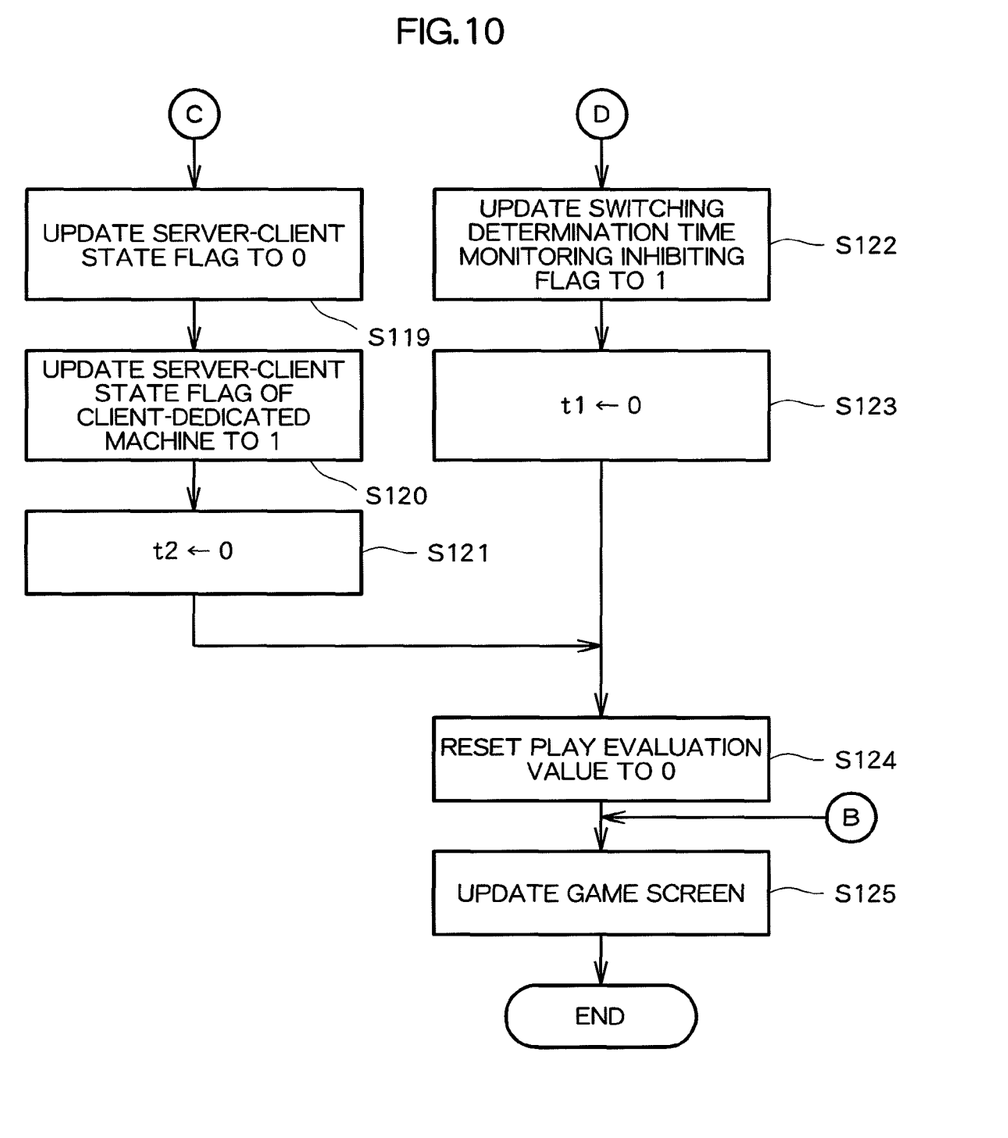
FIG. 10 is a flowchart of a process carried out in each game machine.

In the following, a process to be carried out in each game machine 12 will be described. FIGS. 8 to 10 are flowcharts mainly showing the process related to the present invention among those to be carried out in each game machine 12 during a game for every predetermined period of time (1/60 seconds in this embodiment). This process is realized in each game machine 12 by carrying out a game program read from, for example, an information storage medium, such as a DVD-ROM or the like, or supplied via the communication network 14.

As shown in FIG. 8, in this process, initially, the operation information acquiring unit 26 acquires operation information concerning the content of an operation carried out by the player of its own game machine 12 (S101). Thereafter, the game machine 12 determines whether or not the server-client state flag stored in the server-client information storage unit 22 is set to 1 (S102). In the case where it is determined that the server-client state flag is not set to 1, a client-dedicated state process (S108 to S110) is carried out. On the other hand, in the case where it is determined that the server-client state flag is set to 1, a server-client state process (S103 to S107 and S111 to S124) is carried out.

In the client-dedicated state process, initially, the operation information acquiring unit 26 sends the operation information acquired at S101 to the server-client machine (another game machine 12) (S108). Thereafter, the first game situation information update unit 30 acquires the game situation update information sent from the game situation update information transmitting unit 38 of the server-client machine, from the game situation update information receiving unit 28 (S109). Then, the first game situation information update unit 30 updates the game situation information stored in the game situation information storage unit 20, based on the game situation update information acquired at S109 (S110).

Meanwhile, in the server-client state process, initially, the second game situation information update unit 36 acquires the operation information sent from the operation information acquiring unit 26 of the client-dedicated machine (another game machine 12) (S103). Then, the second game situation information update unit 36 updates the game situation information stored in the game situation information storage unit 20 based on the operation information acquired at S101 and the operation information acquired at S103 (S104). Then, the game situation update information transmitting unit 38 sends the game situation update information describing the updated content of the game situation information at S104 to the client-dedicated machine (S105).

Thereafter, the play evaluation value table is updated (S106 and S107). That is, the play determination unit 46 determines whether or not the player carries out a game play corresponding to the play type stored in the play type storage unit 44 (S106). In the case where it is determined that a game play corresponding to any play type is carried out, the play evaluation value update unit 48 updates the play evaluation value table (S107). Specifically, the play evaluation value update unit 48 acquires an evaluation value corresponding to that play type while referring to the play type table, and then adds the acquired evaluation value to the value stored in the "play evaluation value" field corresponding to the player who carries out the game play (the game machine 12 of the player carrying out the game play).

After the update of the play evaluation value table, a process to monitor the arrival of the switching determination time is carried out (S111 to S117). That is, the switching determination unit 52 increments the value of t2 (S111), in which t2 is a variable for measurement of a period of time elapsed after the switching of the server-client machine (the period of time elapsed after T0 in the case shown in FIG. 7). As this process is carried out every ⅟₆₀th of a second, the value t2 expresses the elapsed period of time in units of ⅟₆₀th of a second. It should be noted that the value of t2 is initialized to 0 at the beginning of the game.

Thereafter, the switching determination inhibiting unit 56 determines whether or not the switching determination time monitoring inhibiting flag is set to 1 (S112). Here, the switching determination time monitoring inhibiting flag is numeric information indicating whether or not to inhibit the monitoring by the switching determination time monitor unit 50. In this embodiment, the switching determination time monitoring inhibiting flag takes the value of either 0 or 1. The switching determination time monitoring inhibiting flag takes the value 1 with the monitoring by the switching determination time monitor unit 50 inhibited, and the value 0 with the monitoring not inhibited.

In the case where the switching determination time monitoring inhibiting flag takes the value 0, that is, in the case that monitoring by the switching determination time monitor unit 50 is not inhibited, a process to monitor the arrival of the switching determination time is immediately carried out (S116).

On the other hand, in the case where the switching determination time monitoring inhibiting flag takes the value 1, that is, in the case where monitoring by the switching determination time monitor unit 50 is inhibited, a process to determine whether or not a predetermined switching inhibited period has elapsed is carried out (S113 and S114). That is, the switching determination inhibiting unit 56 increments the value of t1 (S113), and determines whether or not the value of t1 is smaller than $\Delta Ta$ (S114), in which $\Delta Ta$ is a constant expressing the length of the switching inhibited period (see FIG. 7) in units of ⅟₆₀th of a second, and t1 is a variable for measurement of a period of time elapsed after the determination not to switch the server-client machine (the period of time elapsed after T1 or T3 in the case shown in FIG. 7). As this process is carried out for every ⅟₆₀th of a second, t1 expresses the elapsed period of time in units of ⅟₆₀th of a second. It should be noted that the value of t1 is initialized to 0 at the beginning of the game.

In the case where it is determined that the value of t1 is smaller than $\Delta Ta$, that is, in the case where the switching inhibited period has yet to elapse, a process (S116) to monitor the arrival of the switching determination time or a process (S117 and S118) to determine whether or not to switch the server-client machine from the game machine 12 currently operating as a server-client machine to another game machine 12 is not carried out, and a process to update the game screen image is carried out (S125).

On the other hand, in the case where it is determined that the value of t1 is equal to or larger than $\Delta Ta$, that is, in the case where the switching inhibited period has elapsed, the switching determination inhibiting unit 56 updates the switching determination time monitoring inhibiting flag to 0 (S115), upon which the switching determination time monitor unit 50 resumes monitoring.

In the case where it is determined in S112 that the switching determination time monitoring inhibiting flag takes the value 0, or in S115 that the switching determination time monitoring inhibiting flag is updated to 0, the switching determination time monitor unit 50 determines whether or not the in-play state shifts to the out-of-play state (S116). In the case where it is determined that the in-play state is shifts to the out-of-play state, the switching determination unit 52 determines whether or not the value of t2 is smaller than $\Delta Tb$ (S117), in which $\Delta Tb$ is a constant showing the length of a switch delay period (see FIG. 7) in units of ⅟₆₀th of a second.

In the case where it is determined that the value of t2 is equal to or larger than $\Delta Tb$, that is, in the case where the switch delay period has elapsed, a process to switch the server-client machine is immediately carried out (S119 to S121).

On the other hand, in the case where it is determined that the value of t2 is smaller than ΔTb, that is, in the case where the switch delay period has not elapsed yet, the switching determination unit 52 determines whether or not the play evaluation value of its own game machine 12 (the server-client machine) is equal to or larger than a given reference value, while referring to the play evaluation value table (S118). Then, a process to switch the server-client machine is carried out in the event that it is determined that the play evaluation value is smaller than the reference value (S119 to S121), and a process to inhibit the switching of the server-client machine is carried out in the event that it is determined that the play evaluation value is equal to or larger than the given reference value (S122 and S123).

In the process to switch the server-client machine (S119 to S121), the server switching execution unit 54 updates the server-client state flag stored in the server-client information storage unit 22 of the server-client machine (its own game machine 12) to 0 (S119), and updates the server-client state flag stored in the server-client information storage unit 22 of the client-dedicated machine (another game machine 12) to 1 (S120). Also, the switching determination unit 52 initializes the value of t2 to 0 (S121).

In the switch inhibiting process related to the server-client machine (S122 to S123), the switching determination inhibiting unit 56 updates the switching determination time monitoring inhibiting flag to 1 (S122) to thereby inhibit the monitoring by the switching determination time monitor unit 50. Also, the switching determination inhibiting unit 56 updates the value of t1 to 0 (S123).

After the process to switch the server-client machine or the process to inhibit the switching, the play evaluation value update unit 48 updates the play evaluation value table to thereby reset the play evaluation value of each player (each game machine 12) to 0 (a predetermined initial value) (S124). As described above, in this embodiment, in the case where it is determined that the in-play state shifts to the out-of-play state (that is, the switching determination timing arrives), the play evaluation value is reset to 0. Therefore, whether or not to switch the server-client machine from the game machine 12 currently operating as a server-client machine to another game machine 12 is determined based on the play evaluation value during the period after the previous switching determination time.

After the server-client state process or the client-dedicated state process, the display control unit 32 creates a game screen image in the VRAM based on the content of the game situation information storage unit 20 (S125). The game screen image created in the VRAM is output to the display unit 33 at a predetermined timing for display.

In the above-described network game system 10, whether or not to switch the server-client machine from the game machine 12 currently operating as a server-client to another game machine 12 at a predetermined switching determination time during the game is determined based on the play evaluation value associated with the game machine 12 operating as a server-client machine. Therefore, according to the network game system 10, it is possible to switch the server-client machine while considering the game situation, so that the server-client machine can be switched while avoiding deterioration in the excitement of the game.

Also, in the network game system 10, whether or not the play evaluation value associated with the game machine 12 operating as a server-client machine satisfies a predetermined switch inhibiting condition is determined at a switching determination time during the game, and determination is made so as not to switch the server-client machine from the game machine 12 currently operating as a server-client machine to another game machine 12 in the case where it is determined that the switch inhibiting condition is satisfied, followed by inhibition of the switching of the server-client machine during the subsequent predetermined switching inhibited period. That is, in the case where it is determined at the switching determination time that the play evaluation value associated with the game machine 12 operating as a server-client machine satisfies the switch inhibiting condition, the game machine 12 keeps operating as a server-client machine for at least a switching inhibited period of time since then. That is, according to the network game system 10, the game machine 12 of the player who keeps playing with such higher evaluation that the player evaluation value satisfies the switching restricted condition remains operating as a server-client machine, so that the state advantageous to that player is maintained. Consequently, according to the network game system 10, the game can be preferably produced with an effect reflecting the "tide of the game" or "run" in a real sport game.

In the network game system 10, the server-client machine is switched to another game machine 12 at a switching determination time after elapse of a predetermined switching delayed period after the predetermined reference time, irrespective of the play evaluation value of the game machine 12 operating as a server-client machine. That is, where a problem such that the excitement of the game may be deteriorated is expected in the case where the game machine 12 of one player keeps operating as a server-client machine for an excessively long period of time, the network game system 10 is designed to avoid this problem.

It should be noted that application of the present invention is not limited to the above-described embodiment.

For example, in this embodiment, determination as to whether or not to switch the server-client machine from the game machine 12 currently operating as a server-client machine to another game machine 12 is made at a switching determination time during a game, based on the play evaluation value during the period after the previous switching determination time (see S124 in FIG. 10). Here, as the play evaluation value associated with each game machine 12 is mainly increased depending on the game play carried out by the player of that game machine 12, the play evaluation value at the switching determination time is expected to be affected by the period of time elapsed after the previous switching determination time. Specifically, a larger play evaluation value may result in the case where a longer period of time elapses after the previous switching determination time, and a smaller play evaluation value may result in the case where a shorter period of time elapses after the previous switching determination time. In view of the above, the given reference value may be determined in S118 in FIG. 9, based on the length of the period of time elapsed after the previous switching determination time.

Alternatively, it may be arranged such that whether or not the play evaluation value associated with the game machine 12 operating as a server-client machine is equal to or smaller than a given reference value may be determined in S118 in FIG. 9, for example. In this case, the given reference value may be a value based on the play evaluation value associated with the game machine 12 operating as a client-dedicated machine, for example, (the play evaluation value itself, for example). With this arrangement, a state in which the game machine 12 of the player inferior in skill in playing the game to the opponent player operates as a server-client machine persists. That is, a state advantageous to the player inferior in skill in playing the game to the opponent player persists, so that the excitement of the game play can be enhanced.

Alternatively, the switching determination unit 52 may determine whether or not the play evaluation value of the game machine 12 operating as a client-dedicated machine satisfies a predetermined switch condition, at the switching determination time during the game, and, based on the result of this determination, determine whether or not to switch the server-client machine from the game machine 12 currently operating as a server-client machine to another game machine. In this case, the switch condition may be whether or not the play evaluation value associated with the game machine 12 operating as a client-dedicated machine is equal to or larger than a given reference value. The given reference value may be a predetermined value or a value determined based on the play evaluation value associated with the game machine 12 operating as a server-client machine (the play evaluation value itself, for example).

Alternatively, a plurality of players may be made associated with one game machine 12, for example. In this case, the switching determination unit 52 handles the statistical value of the play evaluation values of the players associated with the game machine 12 as a play evaluation value corresponding to that game machine 12. For example, the average, maximum, or minimum of the play evaluation values of the players associated with the game machine 12 may be used as a play evaluation value corresponding to the game machine 12.

Application of the present invention is not limited to the network game system 10 providing a soccer game, for example. The present invention can be applied to a network game system providing any other sport game or a game of another kind (a fighting game and so forth).

The invention claimed is:

1. A network game system including a plurality of game machines each having a server function and a client function, in which each of the plurality of game machines operates as a client and at least one of the plurality of game machines also operates as a server, thereby providing a game to be played by players of the plurality of game machines, comprising:
    play evaluation value calculating means for calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;
    switching determination time monitoring means for monitoring to see whether or not a predetermined switching determination time, which repetitively arrives during the game, arrives, wherein the predetermined switching determination time comprises an out-of-play state that occurs during the duration of the game;
    switching determination means for, in the case where the switching determination time arrives, making a determination as to whether or not to switch the game machine operating as a server from a game machine currently operating as the server to another game machine of the plurality of game machines, based on the play evaluation value calculated by the play evaluation value calculating means; and
    switching determination inhibiting means for inhibiting the switch determination means from making the determination during a period before a given switching inhibited period elapses, in the case where it is determined not to switch the game machine operating as the server from the game machine currently operating as the server to another game machine of the plurality of game machines.

2. The network game system according to claim 1, wherein the play evaluation value calculating means calculates at least a play evaluation value corresponding to the game machine operating as the server, and
    the switching determination means includes means for determining whether or not the play evaluation value corresponding to the game machine currently operating as the server satisfies a given switch inhibiting condition, and determines not to switch the game machine operating as the server from the game machine currently operating as the server to another game machine of the plurality of game machines in the case where the play evaluation value corresponding to the game machine currently operating as the server satisfies the switch inhibiting condition.

3. The network game system according to claim 1, wherein the switching determination means includes means for determining to switch the game machine operating as the server from the game machine currently operating as the server to another game machine of the plurality of game machines, in the case where the switching determination time arrives after a given switch delay period elapses without switching the game machine operating as the server from the game machine currently operating as the server to another game machine of the plurality of game machines.

4. The network game system according to claim 1, wherein the switching determination means includes means for switching the game machine operating as the server from the game machine currently operating as the server to another game machine of the plurality of game machines in the case that the switching determination time arrives after a predetermined number of successive determinations made not to switch the game machine operating as the server from the game machine currently operating as the server to another game machine of the plurality of game machines.

5. A game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising:
    play evaluation value calculating means for calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;
    switching determination time monitoring means for monitoring to see whether or not a predetermined switching determination time, which repetitively arrives during the game, arrives, wherein the predetermined switching determination time comprises an out-of-play state that occurs during the duration of the game;
    switching determination means for, in the case where the switching determination time arrives, making a determination as to whether or not to switch the game machine operating as a server from a game machine currently operating as the server to another game machine of the plurality of game machines, based on the play evaluation value calculated by the play evaluation value calculating means; and switching determination inhibiting means for inhibiting the switch determination means from making the determination during a period before a given switching inhibited period elapses, in the case where it is determined not to switch the game machine operating as the server from the game machine currently operating as the server to another game machine of the plurality of game machines.

6. A game machine control method for controlling a game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising:

a play evaluation value calculating step of calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;

a switching determination time monitoring step of monitoring to see whether or not a predetermined switching determination time, which repetitively arrives during the game, arrives, wherein the predetermined switching determination time comprises an out-of-play state that occurs during the duration of the game;

a switching determination step of determining, in the case where the switching determination time arrives, whether or not to switch the game machine operating as a server from a game machine currently operating as the server to another game machine of the plurality of game machines, based on the play evaluation value calculated at the play evaluation value calculating step; and a switching determination inhibiting step of inhibiting determination from being made at the switch determination step before a given switching inhibited period elapses, in the case where it is determined not to switch the game machine operating as a server from the game machine currently operating as the server to another game machine of the plurality of game machines.

7. A non-transitory computer readable information storage medium recording a program for causing a computer to function as a game machine included in a network game system including a plurality of game machines each having a server function and a client function, in which each of the plurality of game machines operates as a client and at least one of the plurality of game machines also operates as a server, thereby providing a game to be played by players of the plurality of game machines, the computer functioning as:

play evaluation value calculating means for calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;

switching determination time monitoring means for monitoring to see whether or not a predetermined switching determination time, which repetitively arrives during the game, arrives, wherein the predetermined switching determination time comprises an out-of-play state that occurs during the duration of the game;

switching determination means for, in the case where the switching determination time arrives, making a determination as to whether or not to switch the game machine operating as a server from a game machine currently operating as the server to another game machine of the plurality of game machines, based on the play evaluation value calculated by the play evaluation value calculating means; and switching determination inhibiting means for inhibiting the switch determination means from making the determination during a period before a given switching inhibited period elapses, in the case where it is determined not to switch the game machine operating as the server from the game machine currently operating as the server to another game machine of the plurality of game machines.

8. The network game system according to claim 2, wherein the switching determination means includes means for determining to switch the game machine operating as the server from the game machine currently operating as the server to another game machine of the plurality of game machines, in the case where the switching determination time arrives after a given switch delay period elapses without switching the game machine operating as the server from the game machine currently operating as the server to another game machine of the plurality of game machines.

9. The network game system according to claim 2, wherein the switching determination means includes means for switching the game machine operating as the server from the game machine currently operating as the server to another game machine of the plurality of game machines in the case that the switching determination time arrives after a predetermined number of successive determinations made not to switch the game machine operating as the server from the game machine currently operating as the server to another game machine of the plurality of game machines.

* * * * *